United States Patent [19]
Roskelley

[11] 3,908,492
[45] Sept. 30, 1975

[54] VARIABLE SPEED MOTOR DRIVEN MACHINE TOOL

[76] Inventor: M. Leon Roskelley, 1817 N. Beck St., Salt Lake City, Utah 84116

[22] Filed: July 16, 1973

[21] Appl. No.: 379,589

[52] U.S. Cl............... 82/29 R; 192/18 B; 408/124; 408/140; 74/421 A; 82/30
[51] Int. Cl.² ...................................... B23B 19/00
[58] Field of Search.................... 82/28, 29 R, 29 A; 192/18 B, 48.2, 48.1, 48.91; 408/124, 140; 74/421 A

[56] References Cited
UNITED STATES PATENTS

| | | | |
|---|---|---|---|
| 2,687,197 | 8/1954 | Leifer | 192/18 B |
| 3,061,748 | 10/1962 | Fehn | 82/29 A |
| 3,190,156 | 6/1965 | Schuman | 82/29 A |
| 3,752,019 | 8/1973 | Kaneko | 82/28 R |

FOREIGN PATENTS OR APPLICATIONS

| | | | |
|---|---|---|---|
| 365,569 | 12/1922 | Germany | 82/29 |

*Primary Examiner*—Leonidas Vlachos
*Attorney, Agent, or Firm*—Criddle & Thorpe

[57] ABSTRACT

A machine tool with a headstock incorporating a variable speed electric motor as a motive power source to turn an armature-work shaft. Clutches may be arranged on the opposite ends of the armature-work shaft to couple the output shaft of the motor to a chuck drive shaft, either directly, or through a reduction gearing arrangement.

5 Claims, 3 Drawing Figures

VARIABLE SPEED MOTOR DRIVEN MACHINE TOOL

BRIEF DESCRIPTION OF THE INVENTION

1. Field of the Invention

This invention relates to machine tools and particularly to lathes employing variable speed electric motors as a motive power source.

2. Prior Art

In recent years, the trend in the machine tool industry has been towards development and use of automated tool systems. This has frequently involved the replacing of more simple belt drives, and the like, with complicated and expensive gearing arrangements that will give both speed and torque control. Such changes have, of course, greatly increased the cost of machine tools. The present invention constitutes an inexpensive machine tool having output speed and torque controlled by a variable speed electric motor and clutch arrangement. The present invention provides for coupling of a motor armature shaft directly to a chuck drive shaft, or, where a lower speed at a high torque is required, the coupling of the motor armature shaft to the chuck drive shaft through a reduction gearing arrangement.

In U.S. Pat. No's. 2,033,690 and 3,618,432, there are shown lathes that incorporate a variable speed electric motor as the motive power for the lathe headstock. The lathes of the aforesaid patents are, however, unlike the machine tool of the present invention, in that each connects the motor output through both a flexible coupling and a complicated transmission to turn a chuck drive shaft at a desired rate and with a known torque output. The present invention does not use flexible couplings and extensive gearing arrangements, but instead provides clutch coupling of a variable speed electric motor armature output to directly turn a chuck drive shaft. Alternatively, where high speed and high torque are required, the motor armature turns a reduction gearing arrangement that is coupled to the chuck drive shaft. The clutch couplings serve as a regulating means for chuck drive shaft speed and torque output, and also function as flexible couplings to protect the motor and chuck drive shaft from damage should the drive shaft be restrained from turning.

SUMMARY OF THE INVENTION

It is a principal object of the present invention to provide a machine tool with a headstock that incorporates a variable speed electric motor as the motive power source.

Another object is to provide a machine tool with a headstock that includes clutches for selective coupling of an output of the variable speed electric motor directly to a work engaging member such as a chuck drive shaft, or that, through a reduction gearing arrangement, provides a wide range of speed and torque output potentials to the work engaging members.

Still another object is to provide clutch arrangements that, in addition to providing for the selective coupling of the output of the variable speed electric motor directly to the chuck drive shaft, or to the chuck drive shaft through a reduction gearing arrangement provides flexible couplings that protect the variable speed electric motor and chuck drive shafts from damage should a binding force be applied thereon.

Still another object is to provide a simple, relatively low-cost machine tool headstock that is adaptable for use with a standard machine tool bed, carriage, and tailstock.

Principal features of the tool of the present invention include a variable speed electric motor, preferably controlled through a variable resistance producing device or rheostat that can be adjusted to control the voltage input to the electric motor, thereby varying the turning speed of an armature shaft that extends through the motor.

Clutches are arranged on the ends of the armature shaft to selectively directly couple the output of the electric motor to a chuck drive shaft, or to couple the output through a reduction gearing arrangement to the chuck drive shaft. The clutches are preferably of the magnetic type and are arranged on each of the armature shaft ends, with each clutch containing sets of magnetically attracting, aligned parallel plates. Clutch plates of a first set of clutch plates are connected to and extend at normal angles from around the armature shaft. The plates of a second set of clutch plates of each clutch are interdigitated between and closely proximate to the first set of plates. The plates of the second set are fixed to and radiate at normal angles from around an output portion of the clutch. The first and second sets of plates, when an electric current is applied thereto, magnetically attract one another, thereby coupling the plates together such that rotation of the armature shaft will turn the output portion of the magnetic clutch. The output of one clutch is coupled directly to a chuck drive shaft, and the output sleeve of the other clutch is coupled to a speed reducing gearing arrangement that drives the chuck drive shaft.

The magnetic clutches provide an operator with the capability of connecting the motor armature either directly to the chuck drive shaft or through the reduction gearing arrangement, wherein a low speed, high torque output can be obtained at the chuck drive shaft. The chuck drive shaft, journaled through the hollow armature shaft, has a conventional chuck or face plate secured to one end and a conventional carriage drive gear secured to the opposite end thereof.

Controls are provided for selectively introducing electrical energy to one magnetic clutch or the other, but never to both at the same time.

Additional objects and features of the invention will become apparent from the following detailed description, taken together with the accompanying drawings.

THE DRAWINGS

FIG. 1 is a perspective view, taken from the front and at one side of a lathe incorporating the present invention in the headstock thereof;

FIG. 2, a top plan sectional view taken along the line 2—2 of FIG. 1, exposing the interior of the lathe headstock; and FIG. 3, an enlarged sectional view of a magnetic clutch control switch, taken on the line 3—3 of FIG. 2.

DETAILED DESCRIPTION

Figure 1:
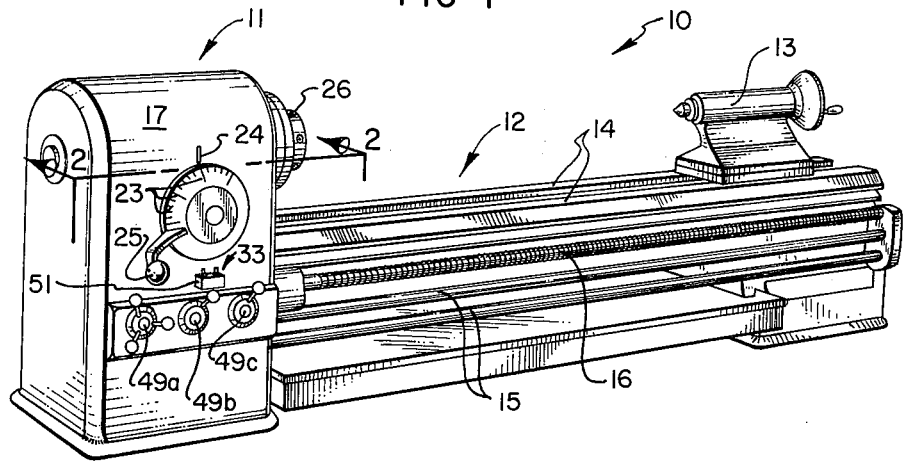

Referring now to the drawings:

FIG. 1 shows a lathe 10 composed of a headstock 11, that incorporates the apparatus of the invention, a bed 12 having parallel bed rails 14 and a tailstock 13 mounted on the bed in conventional fashion. While not shown, it should be understood that a conventional carriage would normally be mounted on the lathe bed to travel on parallel bed guide rails 15 in response to turning of a screw 16, by conventional means, not shown.

Figure 2:
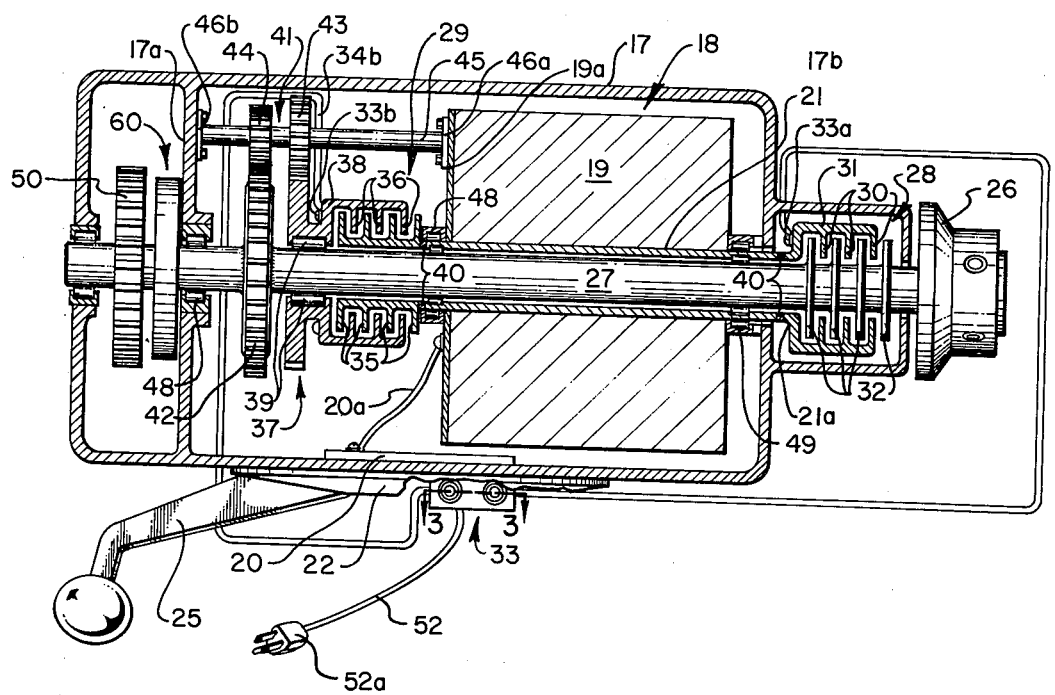

In FIG. 2, there is shown a sectional view of the interior of a housing 17 of the lathe headstock 11. Within the headstock housing 17, there is mounted a variable speed electric motor 18, containing a field coil 19, that receives a controlled voltage from a rheostat 20 and that turns a hollow armature shaft 21. The electric motor 18 is mounted within the headstock housing 17, and the field coil 19 thereof receives the controlled voltage from the rheostat 20 through a grounded two-wire cable 20*a*. The rheostat 20 provides a variable series resistance between the field coil and a conventional source of electrical power, not shown, and is controlled in response to positioning of a dial 22 arranged at the side of the headstock housing 17. The dial 22 has markings 23, FIG. 1, around an outer circumference, that are indicative of various values of resistance through the rheostat 20. Rotation of a handle 25 that is fixed to and that extends from the dial 22, will align a particular marking 23 on the dial with an indicator 24 marked on the side of the headstock housing 17, to thereby set a particular resistance value across the rheostat. The particular resistance set regulates the value of voltage available at the field coil 19 when an electric current is introduced into the circuit, thereby controlling the speed of turning of the hollow armature shaft 21.

As shown in FIG. 2, the hollow armature shaft 21 has a drive shaft 27 journalled therethrough. When the hollow armature shaft 21 of the variable speed electric motor 18 is directly connected to the drive shaft 27 the speed of rotation of a standard chuck 26 mounted to the end of the drive shaft and extending beyond the headstock housing 17 is controlled by the particular setting of the rheostat dial 22. In those instances where eigher high speed-high torque output or low speed-low torque outputs are required, such a direct coupling is entirely satisfactory. When, however, the job requirement calls for low speed-high torque output, the direct coupling of the motor output to the chuck may not be entirely satisfactory. Therefore, to provide a high torque output of the chuck 26 at low speeds, a speed reduction gearing arrangement is provided between the armature shaft output and the chuck drive shaft 27.

To provide both direct coupling and coupling through a gearing arrangement of the motor armature shaft 21 and chuck drive shaft 27, the present invention includes first and second magnetic clutches 28 and 29. The clutches are similarly constructed and each includes sets of interdigitating first and second sets of spaced parallel plates. The first clutch 28 contains a first set of plates 30 that are spaced apart from one another and that each radiate inwardly at a normal angle from a collar 31 that is secured to an end 21*a* of the hollow armature shaft 21. The first set of plates 30 is interdigitated with a second set of plates 32 that are also spaced apart from one another and that radiate at normal angles from the chuck drive shaft 27 to which they are fixed. The magnetic clutch is electrically energized and the first and second sets of plates 30 and 32 are magnetically coupled together by an electric current supplied through wire 34*a*, and a conductive ring and wiper assembly 33*a* connected to the plates 30. Plates 30 are energized and magnetically attract and engage plates 32, thereby magnetically coupling the armature shaft 21 directly to the chuck drive shaft 27.

The second magnetic clutch 29, like the described first magnetic clutch 28, contains sets of first spaced apart parallel plates 35 that interdigitate with a second set of plates 36. The first set of plates 35 are each secured to radiate outwardly at normal angles from an end 21*b* of the armature shaft 21. The second set of plates 36 are secured to extend inwardly at normal angles from around a hub 38 of a spur gear 37. The spur gear 37 is journalled on a bearing 39 around the chuck drive shaft 27, and turns independently of the drive shaft. Gear 37 is part of a gear train, shown generally at 41, arranged on one end of shaft 21 and extends outwardly at a normal angle from around the hub 38 end opposite to the second set of plates 36 to mesh with a transfer gear 43 of the gear train. The gear train 41 provides a speed reduction to the chuck drive shaft 27 in a manner to be hereinafter described in detail.

Like the first clutch 28, the clutch 29 is energized by an electric current transmitted through an electrically conductive ring and wiper arrangement 33*b* and wire 34*b* to plates 36. When current is applied thereto, the plates 36 attract the plates 35, thereby magnetically coupling the drive shaft 27 to the spur gear 37.

The magnetic clutches herein described are conventional and well known. A magnetic clutch, No. 4200524, manufactured by Baruftaldi Frizioni Spa of S'Donato, Milano, Italy, for example, is satisfactory for the purpose.

As has been noted, the magnetic clutches 28 and 29 are energized by application of an electric current transmitted through wires 34*a* or 34*b*. Wires 34*a* and 34*b* lead from a clutch control switch 33, FIG. 3, the operation of which will be hereinafter described. The clutch control switch 33 provides power to one or the other of the magnetic clutches, but does not allow both clutches to be simultaneously operated.

The respective sets of interdigitating plates of the magnetic clutches do not actually contact one another, but rely on controlled magnetic attraction to provide the coupling. Should a torque that is counter to the normal direction of rotation of the chuck 26 be exerted thereon, or should the chuck 26 be immobilized, then that counter slippage between the clutch plates will prevent damage to any of the other components of the headstock 11.

Although not shown in detail herein, it will be understood that bonded insulation means 40 separates the clutch plates 30 and 35 from the armature shaft 21 so that the set of plates 30 and the set of plates 36 can be individually energized.

The gear train 41, FIG. 2, includes a pair of spaced-apart transfer gears 43 and 44 fixed to a shaft 45. Transfer gear 43 is larger than transfer gear 44. The opposite ends of shaft 45 are journalled in end thrust bearings 46*a* and 46*b* that are secured, respectively, to an interior lateral wall 17*a* of the headstock housing and a plate 47 secured to an end plate 19*a* of the motor field coil 19. So arranged, the shaft 45 with transfer gears 43 and 44 will axially turn freely within the headstock housing. The transfer gear 43 is arranged to be in meshing engagement with the spur gear 37, and turns therewith when the second magnetic clutch 29 is engaged. The transfer gear 44 is, in turn, meshed with the drive spur gear 42 that is secured to the chuck drive shaft 27. As is well known, the differences in the circumferences of the respective meshed gears determines the ratio of input to output speed of rotation between the armature shaft 21 and chuck drive shaft 27. Obviously, therefore, the selection of the gears used determines the speed reductions to be obtained through the gear train 41.

While the described gear train 41 is the presently preferred reduction gearing arrangement, it should be understood that other gearing, such as a planetary arrangement, or an arrangement having a greater number of intermeshing spur gears, could be substituted for the arrangement shown without departing from the subject matter coming within the scope of this application.

As previously noted, the chuck drive shaft 27 is journalled through the hollow armature shaft 21 and extends beyond both ends thereof. Bearings 48 are provided within the hollow armature shaft 21 to engage the surface of the chuck drive shaft 27, and to provide independent rotation to each shaft. The chuck drive shaft 27 is also journalled through bearings 49 arranged around openings in front of headstock housing wall 17b, the field coil end plate 19a and the headstock housing interior lateral wall 17a. The chuck drive shaft turns freely on bearings 49 and has the chuck 26 arranged on one end thereof in spaced alignment with the tailstock 13. A carriage drive gear 50 is arranged on the opposite chuck drive shaft end. The carriage drive gear 50 is adapted to mesh in known fashion with appropriate gearing of a conventional carriage drive transmission, not shown, to turn the screw 16 that drives the carriage, not shown.

The first and second magnetic clutches 28 and 29, respectively, serve as a means for coupling the motor armature shaft directly to the chuck drive shaft or through the gear train 41 and then to the chuck drive shaft. This alternative coupling capability provides for speed and torque controls supplemental to the speed control provided by the rheostat 20. When the output of the variable speed electric motor 18 is directed through the described speed reduction gearing, the resultant output speed of the chuck drive shaft is slower than when there is a direct coupling of the motor output and the chuck drive shaft. It will be apparent, therefore, that simultaneous engagement of both clutches 28 and 29 must be prevented. The clutch control switch 33 is included to provide this required safety control.

Figure 3:
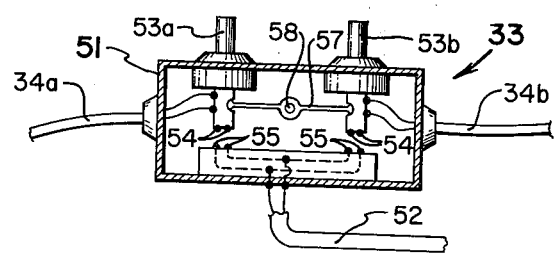

The clutch control switch, as shown in FIG. 3, is arranged in a housing 51 that is mounted to the headstock housing, FIG. 1. A source of electrical energy represented by an electrical cord 52 and plug 52a is connected into the housing 51 supplying power to the switch arrangement therein.

As seen in FIG. 3, the wires of electrical lines 34a and 34b are respectively connected to terminals provided therefore on actuator plunger 53a and 53b. The terminals are connected to contact members 54 at the lower ends of the plunger and the contact members 54 on each plunger are adapted to be pushed downwardly into engagement with corresponding contact members 55 on the top of a support member 56. The wires of electrical cord 52 are connected to the contact members 55 such that when the plunger 53a is depressed to place the contact members 54 thereon in engagement with contact members 55 a circuit is completed through the wires of cord 52, plunger 53a, line 34a and clutch 28. Similarly, when the plunger 53b is depressed, the contact members 54, thereon, are moved into engagement with contact members 55 to complete a circuit from the wires of cord 52, through the plunger 53b and clutch 29.

A rocker arm 57 is pivotally connected at 58 to housing 51 and the ends of the rocker arm extend into sockets provided therefor in the plungers so that as one plunger is depressed the other is simultaneously raised. Thus, the contact members 54 of only one plunger can be in engagement with contact members 55 at any given time. Consequently, it is not possible for circuits to be simultaneously completed from line 52 through the clutches 28 and 29.

If desired, conventional snap-acting plungers (not shown) can be used to insure positive make-and-break of the circuits through the plungers.

A conventional magnetic brake 60 selectively interconnects wall 17a of the housing 17 with the chuck drive shaft 27 so that rotation of the chuck drive shaft can be stopped by energization of the brake. Thus, with both clutches 28 and 29 disengaged, the brake 60 can be operated to stop rotation of the chuck 26 even while the motor 18 continues to operate and armature shaft 21 continues to axially rotate. Consequently, it is not necessary to continually start and stop motor 18 and wear on the motor is reduced.

Because of the immediate response afforded by the present invention, through control of the clutches 28 and 29 and brake 60, it should be obvious that the tool is easily programmed for automated control.

Although a preferred form of my invention has been herein disclosed, it is to be understood that the present disclosure is made by way of example and that variations are possible without departing from the subject matter coming within the scope of the following claims, which subject matter I regard as my invention.

I claim:
1. A machine tool comprising
   a housing;
   a variable speed electric motor arranged within said housing;
   a hollow armature shaft turned by said variable speed electric motor, said hollow armature shaft having ends protruding outwardly of said electric motor;
   means for regulating electrical current to said variable speed electric motor whereby said hollow armature shaft is rotated at a desired speed;
   a drive shaft having a work engaging portion on one end;
   means journaling said drive shaft through said hollow armature shaft, said drive shaft extending from the ends of said armature shaft;
   a first magnetic clutch means at one end of the hollow armature shaft for directly coupling one end of said hollow armature shaft to said drive shaft;
   reduction gearing including a gear fixed to and rotatable with the drive shaft;
   a second magnetic clutch means at the other end of the hollow armature shaft for indirectly coupling said hollow armature shaft to said drive shaft through said reduction gearing when said clutch is appropriately energized; and
   means for electrically insulating said first and second magnetic clutch means from one another;
   means for controlling the said first and second clutch means such that only one said clutch means will be operated to couple the armature shaft to the drive shaft at a time.

2. A machine tool as in claim 1, wherein the means for providing a variable electrical current to said variable speed electric motor consists of
- a rheostat connected electrically between a power source and said electric motor to provide varying values of resistance therebetween; and
- means connected to said rheostat for setting a desired value of resistance thereacross.

3. A machine tool as recited in claim 2, wherein the means for controlling the first and second clutches includes
- a housing;
- a pair of switches arranged in said housing each one of which selector switches, when actuated, engaging an electrical contact to complete an electrical circuit to one of said clutch means; and
- means arranged in said housing and engaging said selector switches for prohibiting the simultaneous closing of both selector switches to complete an electrical circuit therethrough.

4. A machine tool as recited in claim 3, further including
- brake means for selectively stopping rotation of said drive shaft when said first and second clutch means are both disengaged.

5. A machine tool comprising
- a housing;
- a variable speed electric motor arranged within said housing;
- an armature shaft extending from and turned by said variable speed electric motor;
- means for regulating electrical current to said variable speed electric motor whereby an adjustably controlled speed of rotation of said armature shaft is obtained;
- a work engaging member;
- first magnetic clutch means for directly coupling said armature shaft to said work engaging member for corresponding rotation therewith;
- a gear train including a gear fixed to and rotatable with the work engaging member;
- second magnetic clutch means for indirectly coupling said armature shaft to said work engaging member through said gear train;
- means for alternatively operating said first and second clutch means, whereby said armature shaft is either directly or indirectly connected to said work engaging member; and
- means for electrically insulating said first and second magnetic clutch means from one another.

* * * * *